US012737393B2

(12) United States Patent
Szabo et al.

(10) Patent No.: US 12,737,393 B2
(45) Date of Patent: Sep. 15, 2026

(54) SUGGESTED ALTERATIONS FOR MODIFIABLE CONTENT

(71) Applicant: GOOGLE LLC, Mountain View, CA (US)

(72) Inventors: Jacint Szabo, Zurich (CH); Gabriel Rovina, Zurich (CH)

(73) Assignee: GOOGLE LLC, Mountain View, CA (US)

(*) Notice: Subject to any disclaimer, the term of this patent is extended or adjusted under 35 U.S.C. 154(b) by 248 days.

(21) Appl. No.: 18/436,673

(22) Filed: Feb. 8, 2024

(65) Prior Publication Data

US 2025/0258848 A1 Aug. 14, 2025

(51) Int. Cl.
*G06F 16/3329* (2025.01)
*G06F 16/34* (2025.01)
*G06F 40/40* (2020.01)

(52) U.S. Cl.
CPC ........ *G06F 16/3329* (2019.01); *G06F 16/345* (2019.01); *G06F 40/40* (2020.01)

(58) Field of Classification Search
CPC ..... G06F 16/3329; G06F 16/345; G06F 40/40
See application file for complete search history.

(56) References Cited

U.S. PATENT DOCUMENTS 12,118,296 B2 10/2024 Wilde
2023/0351091 A1 11/2023 Gil
2024/0320444 A1* 9/2024 Maschmeyer ...... G06F 3/04845
2024/0354503 A1* 10/2024 Baruch ................ G06F 16/345
2025/0209389 A1* 6/2025 Woulfe ........... G06Q 10/06311

OTHER PUBLICATIONS

Joshi, With Great Power Comes Great Responsibility!: Student and Instructor Perspectives on the influence of LLMs on Undergraduate Engineering Education, 2023, arXiv, whole document (Year: 2023).*
European Patent Office; International Search Report and Written Opinion issued in Application No. PCT/US2025/013724; 10 pages; dated May 2, 2025.

* cited by examiner

*Primary Examiner* — Sonia L Gay
(74) *Attorney, Agent, or Firm* — Gray Ice Higdon

(57) ABSTRACT

Implementations are described herein for leveraging generative models such as LLMs to generate and provide recommended alterations to various types of content. In various implementations, a LLM input prompt may be processed using an LLM to generate a first LLM response, which may be operable to cause first content derived from the first LLM response to be rendered. At least a portion of the first LLM response may be assembled with a request to generate recommended alteration(s) to the portion of the first LLM response and processed using the LLM to generate a second LLM response. The second LLM response may be operable to cause selectable element(s) to be rendered. Each of the selectable element(s) may: identify a respective recommended alteration, and be operable to cause corresponding modified content to be rendered. The modified content may include at least some of the first content modified based on the recommended alteration.

20 Claims, 9 Drawing Sheets

SUGGESTED ALTERATIONS FOR MODIFIABLE CONTENT

BACKGROUND

Generative models such as large language models (LLMs) can be used to process, as LLM input, sequences of input tokens to generate, as LLM responses, sequences of output tokens. These sequences of input/output tokens often take the form of and/or otherwise represent strings of text, although they can take other forms such as embeddings, numbers, etc. Some LLM responses may include a relatively large number of details and/or extensive natural language. For example, a user may request that the LLM be used to generate a multi-paragraph summary of a document, a detailed invitation to a birthday party, a business email, etc.

If a user is dissatisfied with a rendered LLM output, they can copy the LLM output into a text editor and then modify the text manually. However, this process may be cumbersome enough to discourage use of the LLM in the first place. Alternatively, the user may issue a follow up natural language request to modify the entire LLM output, e.g., to add more detail, change the LLM output's "tone," replace tokens with other tokens (e.g., synonyms), etc. However, it may be the case that the user is satisfied with some parts of the LLM output but not with others. Moreover, the user may lack knowledge or experience to recognize that the LLM output is deficient in some way.

SUMMARY

Implementations described herein relate to leveraging generative models such as LLMs to generate and provide recommended alterations to various types of content, such as LLM-generated content and/or user-composed content. More particularly, but not exclusively, implementations described herein relate to providing workflows that process LLM-generated or user-composed content (collectively, "modifiable content") to generate selectable element(s) corresponding to recommended alteration(s) of the modifiable content, and presenting those selectable element(s) to users. This enables users to selectively leverage the LLM to improve modifiable content in ways that may or may not have occurred to the users, e.g., due to their lack of experience, knowledge, or expertise.

In various implementations, modifiable content may be assembled into an LLM input prompt with a separate (e.g., implicit) request to generate recommended (or proposed) alteration(s) to the modifiable content. The request to recommend alteration(s) may take various forms. In some implementations, the request may be a natural language request, such as "what is <modifiable content> missing?" (which may cause the LLM to output data indicative of information that the LLM is trained to typically encounter in similar content but is missing from the modifiable content). In other implementations, the request may be in the form of predesignated token(s) or symbol(s) that the LLM has been pre-trained and/or fine-tuned to recognize as a request to generate recommended alteration(s).

In some implementations, the modifiable content (e.g., text, images, audio, any combination thereof) may be encoded into input tokens (e.g., words, characters, numeric embeddings, etc.) that are dimensioned appropriately for processing by the LLM, along with additional input token(s) that represent the request to generate recommended alteration(s). The input prompt may then be processed using the LLM to generate an LLM response. The LLM response may include tokens from which various information can be derived (e.g., read or consumed directly, decoded, etc.).

At least a portion of the LLM response may also be operable, e.g., by a client application operated by the user, to cause selectable element(s) corresponding to the recommended alteration(s) to be presented at the client application. These selectable element(s) may take various forms depending on factors such as the output modality employed by the client application (e.g., audio output versus visual output), the nature of the recommended alteration, and so forth. Operation of one of these selectable elements may cause the corresponding recommended alteration to be affected on the modifiable content and/or presented as output at the client application of the user.

In some implementations, when a selectable element is operated, the corresponding recommended alteration and the original modifiable content may be assembled into a new input prompt that is processed using the LLM to generate a new LLM response in which the modifiable content has been updated based on (e.g., incorporates) the recommended alteration. The LLM may have hundreds of billions of parameters or more. Accordingly, waiting to process this new input prompt until the user has affirmatively operated a selectable element avoids expending the considerable computing resources and/or energy associated with applying the LLM to data unless the user explicitly requests it.

Alternatively, in some implementations, the recommended alteration and modifiable content may be processed automatically and/or proactively, e.g., behind the scenes and/or in parallel to the original modifiable content being presented to the user. The resulting new LLM response may then be cached client side and/or server side. In at least some of these implementations, operation of the selectable element may cause the cached new LLM response (or content derived therefrom) to be presented to the user. Caching the new LLM response (or content derived therefrom) in this manner may reduce or eliminate latency that the user might otherwise experience if the new LLM response is not generated until the selectable element is operated.

In some implementations, a selectable element may include a textual summary of and/or brief textual statement describing the recommended alteration that would be implemented/surfaced should the user operate the selectable element. For instance, suppose the original modifiable content is a user-composed or LLM-generated project proposal. Suppose further that the project proposal lacks any discussion of risk(s) associated with implementing the project, and that the underlying LLM has been trained using at least some project proposals that do discuss risks (in which case the LLM "expects" to see risk discussion in project proposals). In such a scenario, a selectable element may be generated that includes a recommended alteration such as "Discussion of risk appears to be missing; would you like to add it?", or "I don't see any discussion of risk. Would you like to see some examples of what your proposal would look like with risk discussion added?" In some implementations, the textual summary may be generated by the LLM based on a longer version of the recommended alteration (e.g., a whole LLM-generated paragraph describing potential risk(s)), e.g., by requesting the LLM summarize the longer version of the recommended alteration.

The recommended alterations generated using the LLM may vary depending on various factors, such as the nature and/or modalit(ies) of the modifiable content, contextual information that is available for inclusion in the LLM input prompt, data used to pretrain and/or fine-tune the LLM, and so forth. As one non-limiting example, suppose the modifiable content processed using the LLM is a resume that includes some number of positions filled by a user over a span of time (e.g., since graduating college). Suppose further that the timeline formed by the positions is incomplete because the resume fails to account for some intermediate time interval (i.e. there is a gap in the resume).

In various implementations, when the resume (which may be user-composed or LLM-generated) is processed using the LLM along with the request to generate recommended alteration(s), the LLM response may be operable to cause a selectable element to be rendered to the user that recommends "filling the gap in the resume's timeline." If the user operates the selectable element, the user's resume may be generated once again, except a placeholder may be incorporated into the resume by the LLM, e.g., in a position that corresponds to the gap in the user's employment timeline. The user may then have the option of manually editing the placeholder to add a job description. Alternatively, if contextual data of the user is available for processing using the LLM, then this contextual data may be mined, e.g., to determine what the user's position was during the timeline gap and automatically generate and incorporate a description of that position into the modified resume.

In some implementations, a method may be implemented using one or more processors and may include: processing a large language model (LLM) prompt using an LLM to generate a first LLM response; providing the LLM response to a client application, wherein the first LLM response is operable by the client application to cause first content derived from the first LLM response to be rendered at one or more output devices; assembling, as a second LLM prompt, at least a portion of the first LLM response with data indicative of a request to generate one or more recommended alterations to the portion of the first LLM response; processing the second LLM prompt using the LLM to generate a second LLM response; and providing at least a portion of the second LLM response to the client application, wherein the portion of the second LLM response is operable by the client application to cause one or more selectable elements to be rendered at one or more of the output devices, wherein each of the one or more selectable elements: identifies a respective one of the recommended alterations, and is operable to cause corresponding modified content to be rendered at one or more of the output devices, wherein the modified content includes at least some of the first content modified based on the respective one of the recommended alterations.

In various implementations, the method may include: receiving, from the client application, an indication that one or more of the selectable elements was operated; and in response to the receiving, providing a remainder of the second LLM response to the client application, wherein the modified content corresponding to the operated selectable element is derived from the remainder of the second LLM response.

In various implementations, the method may include: receiving, from the client application, an indication that one or more of the selectable elements was operated; and in response to the receiving: assembling, as a third LLM prompt, at least a portion of the first LLM response and data indicative of the recommended alteration identified by the given selectable element, processing the third LLM prompt using the LLM to generate a third LLM response, and providing at least a portion of the third LLM response to the client application, wherein the portion of the third LLM response is operable by the client application to cause the modified content to be rendered at one or more of the output devices.

In various implementations, the method may include: receiving, from the client application, an indication of a subportion of the first content that has been selected using one or more input devices; and extracting, as the portion of the first LLM response that is assembled into the second LLM prompt, a subportion of the first LLM response that corresponds to the selected subportion of the first content.

In various implementations, the portion of the second LLM response provided to the client application may include the entire second LLM response. In various implementations, at least the portion of the second LLM response may be operable by the client application to locally cache one or more instances of modified content corresponding to one or more of the selectable elements.

In various implementations, a given selectable element of the one or more selectable elements may include a textual summary of the modified content that is rendered in response to operation of the given selectable element. In various implementations, the first LLM response may include one or more time descriptions forming an incomplete timeline, and one or more of the recommended alterations includes an additional time description to fill a gap in the incomplete timeline.

In various implementations, the method may include: formulating a search query based on one or more details of the first LLM response; and retrieving, from a search engine, one or more documents that are responsive to the search query; wherein a given selectable element of the one or more selectable elements is operable to cause additional content from the one or more documents that are responsive to the search query to be included in the second LLM prompt.

In another aspect, a method may be implemented using one or more processors and may include: receiving, from a user via a client application, a user-composed content; assembling, as a first large language model (LLM) prompt, data indicative of the user-composed content and data indicative of a request to generate one or more recommended alterations to the user-composed content; processing the first LLM prompt using an LLM to generate a first LLM response; and providing at least a portion of the first LLM response to the client application, wherein the portion of the first LLM response is operable by the client application to cause one or more selectable elements to be rendered at one or more output devices, wherein each of the one or more selectable elements: identifies a respective one of the recommended alterations, and is operable to cause corresponding modified content to be rendered at one or more of the output devices, wherein the modified content includes at least some of the user-composed content modified based on the respective one of the recommended alterations.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
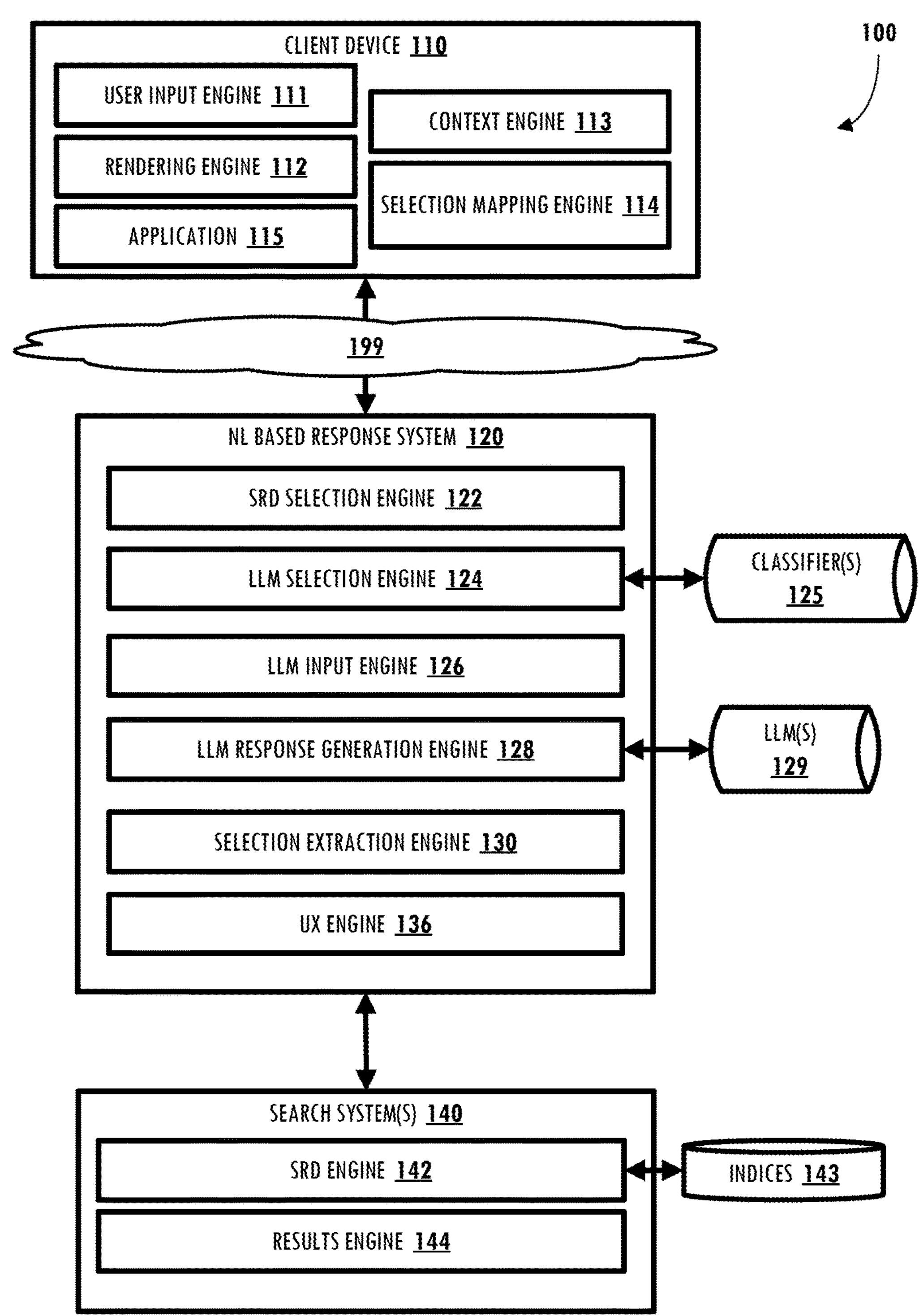
FIG. 1 schematically depicts an example environment in which selected aspects of the present disclosure may be implemented.

Turning now to FIG. 1, a block diagram of an example environment 100 that demonstrates various aspects of the present disclosure, and in which implementations disclosed herein can be implemented is depicted. The example environment 100 includes a client device 110, a natural language (NL) based response system 120, and search system(s) 140. Although illustrated separately, in some implementations all or aspects of NL based response system 120 and all or aspects of search system(s) 140 can be implemented as part of a cohesive system.

In some implementations, all or aspects of the NL based response system 120 can be implemented locally at the client device 110. In additional or alternative implementations, all or aspects of the NL based response system 120 can be implemented remotely from the client device 110 as depicted in FIG. 1 (e.g., at remote server(s)). In those implementations, the client device 110 and the NL based response system 120 can be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more applications, such as application 115, via which queries can be submitted and/or NL based summaries and/or other response(s) to the query can be rendered (e.g., audibly and/or visually). The application 115 can be an application that is separate from an operating system of the client device 110 (e.g., one installed "on top" of the operating system)—or can alternatively be implemented directly by the operating system of the client device 110. For example, the application 115 can be a web browser installed on top of the operating system, or can be an application that is integrated as part of the operating system functionality. The application 115 can interact with the NL based response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110. Some instances of a query or request described herein can be a query or request that is formulated based on user input provided by a user of the client device 110 and detected via user input engine 111. For example, the query or request can be a typed query or request that is typed via a physical or virtual keyboard, a suggested query or request that is selected via a touch screen or a mouse, a spoken voice query or request that is detected via microphone(s) of the client device, or an image query or request that is based on an image captured by a vision component of the client device.

In various implementations, the client device 110 can include a rendering engine 112 that is configured to provide content (e.g., an NL based summary, creative LLM output, chat output, etc.) for audible and/or visual presentation to a user of the client device 110 using one or more user interface output devices. For example, the client device 110 can be equipped with one or more speakers that enable content to be provided for audible presentation to the user via the client device 110. Additionally, or alternatively, the client device 110 can be equipped with a display or projector that enables content to be provided for visual presentation to the user via the client device 110. In some implementations, the display may be part of a head-mounted display (HMD).

In some implementations, rendering engine 112 may be configured to generate rendered content based on raw LLM responses. For example, an LLM response may include a sequence of tokens that is operable by rendering engine 112 to render audible and/or visual output. In some implementations, this sequence of tokens may include a sequence of raw text. Some parts of the sequence of raw text may include meaningful content that is responsive to a user's query or request. Other parts of the sequence of text may include metadata instructions (e.g., symbols) that are usable, e.g., by rendering engine 112 (or by UX engine 136, described below), to cause the meaningful content to be rendered in a particular way (e.g., with selected fonts, line breaks, images, formatting, etc.). In some implementations, rendering engine 112 may also be configured to create a mapping between raw LLM responses and the downstream rendered content that is generated based on the raw LLM responses. For instance, when incorporating raw LLM content into hypertext markup language (HTML) or extensible markup language (XML) DOM nodes, rendering engine 112 may add attributes (e.g., character offsets) to HTML tags that identify where in the underlying raw LLM response the content that is going to be displayed using the DOM node is located.

In various implementations, the client device 110 can include a context engine 113 that is configured to determine a context (e.g., current or recent context) of the client device 110 and/or of a user of the client device 110. In a multi-turn dialog session between the user and an automated assistant (alternatively, "virtual assistant", "chatbot", etc.), the context of the client device and/or user may be maintained over multiple turns as a "user state."

In some implementations, the context engine 113 can determine a context and/or update the user's state utilizing current or recent interaction(s) via the client device 110, a location of the client device 110, profile data of a profile of a user of the client device 110 (e.g., an active user when multiple profiles are associated with the client device 110), and/or other data accessible to the context engine 113. For example, the context engine 113 can determine a current context based on a one or more recent queries of the search session, profile data, and/or a current location of the client device 110. For instance, the context engine 113 can determine a current context of "looking for a healthy lunch restaurant in Louisville, Kentucky" based on a recently issued query or request, profile data, and a location of the client device 110.

As another example, the context engine 113 can determine a current context based on which application is active in the foreground of the client device 110, a current or recent state of the active application, and/or content currently or recently rendered by the active application. A context determined by the context engine 113 can be utilized, for example, in supplementing or rewriting a query or request that is formulated based on user input, in generating an implied query or request (e.g., a query or request formulated independent of user input), and/or in determining to submit an implied query/request and/or to render result(s) for an implied query/request. And the user's context across multiple turns of a search session can be used as a user state to enrich output rendered, e.g., by a search chatbot companion, at each turn of a multi-turn human-to-computer dialog session.

In various implementations, client device 110 can include a selection mapping engine 114 that is configured to map user-selected subportion(s) of rendered LLM output provided by rendering engine 112 to corresponding subportion(s) of raw LLM responses that were used to generate the rendered LLM output. In some implementations, selection mapping engine 114 may utilize the HTML attributes (e.g., character offsets) mentioned previously to map user-selected subportion(s) of rendered LLM output provided by rendering engine 112 to corresponding subportion(s) of raw LLM responses.

In various implementations, selection mapping engine 114 may provide data indicative of this mapping, such as starting and ending characters indexes in the raw LLM response, to other components to extract the corresponding portion of the raw LLM response. In some cases, selection mapping engine 114 may provide data indicative of the mapping to a component of NL based response system 120, such as selection extraction engine 130, and selection extraction engine 130 may extract the corresponding portion of the raw LLM response. In other cases, selection mapping engine 114 may use the mapping data directly to extract the corresponding portion of the raw LLM response, and provide that extracted portion to a component of NL based response system 120, such as LLM input engine 126 (discussed in more detail below).

Further, the client device 110, the NL based response system 120, and/or the search system 140 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form a coordinated ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

NL based response system 120 is illustrated as including a search result document (SRD) selection engine 122, an LLM selection engine 124, an LLM input engine 126, an LLM response generation engine 128, a selection extraction engine 130, and a user interface (UX) engine 136. Some of the engines can be omitted and/or combined in various implementations.

The SRD selection engine 122 may be configured to generate, using an LLM and search result documents that are responsive to a query, information that may not be readily generated using the LLM alone, such as an NL based summary response to a query, or information derived from documents that are more recent than the last instance in which the LLM was trained or fine-tuned. SRD selection engine 122 may also cause the NL based summary to be rendered in response to the query.

The LLM selection engine 124 can, for example, select zero or more generative models from multiple candidate LLMs. For example, in some iterations the system will determine to not utilize any of the candidate generative models, in some iterations the system will determine to utilize only one of the candidate generative models, and in some iterations the system will determine to utilize multiple of the candidate generative models. LLM selection engine 124 can optionally utilize one or more rules and/or one or more classifiers 125 that are trained to generate output identifying which LLMs are best suited to generate a response to a current query or request, given a current user state/context.

The LLM input engine 126 may be configured to assemble LLM input prompts based on data such as a current query, current user state/context, past queries, past LLM responses (which may be included in the current user state/context), portions of past rendered LLM outputs that are selected by users for modification, search result documents, etc. LLM input prompts may, in some implementations, include a sequence of tokens, which may be words, phrases, numbers, and/or embeddings generated from data such as text, images, audio, etc.

The LLM response generation engine 128 may be configured to apply one or more LLMs stored in an LLM database 129 to LLM input prompts generated by LLM input engine 126 to generate an LLM response. An LLM response may take various forms, such as a sequence of tokens that correspond to, represent, or directly convey words, phrases, embeddings, etc. LLMs (or more generally, generative models) stored in LLM database 129 may take a variety of forms, such as PaLM, BERT, LaMDA, Meena, Genesis and/or any other LLM, such as any other LLM that is encoder-only based, decoder-only based, sequence-to-sequence based and that optionally includes an attention mechanism or other memory. Visual language models (VLMs) capable of processing images and text may be included as well.

In various implementations, LLM input engine 126 may be configured to assemble an LLM input prompt with a separate (e.g., implicit) request to generate recommended (or proposed) alteration(s) to the modifiable content. Also, the original modifiable content may be assembled by LLM input engine 126 into a new input prompt that is processed using the LLM to generate a new LLM response in which the modifiable content has been updated based on (e.g., incorporates) the recommended alteration.

Selection extraction engine 130 may be configured to extract subportions of raw LLM responses that correspond with selected subportions of rendered LLM output provided at client device 110 by rendering engine 112 based on the raw LLM responses. As noted previously, in some implementations, selection extraction engine 130 may extract these portions of raw LLM responses based on mapping data received from selection mapping engine 114. For example, selection mapping engine 114 may provide starting and/or ending character positions, and selection extraction engine 130 may extract the subportion of the raw LLM response that begins at the starting character position and ends at the ending character position.

In some implementations, LLM input engine 126 and/or LLM response generation engine 128 may cooperate to provide recommended alterations to various types of content, such as LLM-generated content and/or user-composed content. In various implementations, modifiable content may be assembled, e.g., by LLM input engine 126, into an LLM input prompt with a separate (e.g., implicit) request to generate recommended (or proposed) alteration(s) to the modifiable content. The request to recommend alteration(s) may take various forms. In some implementations, the request may be a natural language request, such as "what is <modifiable content> missing?" (which may cause the LLM to output data indicative of information that the LLM is trained to typically encounter in similar content but is missing from the modifiable content). In other implementations, the request may be in the form of predesignated token(s) or symbol(s) that the LLM has been pre-trained and/or fine-tuned to recognize as a request to generate recommended alteration(s).

LLM response generation engine 128 may be configured to process this LLM input prompt (which includes the separate request) using one or more LLMs 129 to generate LLM output. The LLM output may include, among other things, data that is operable, e.g., by client device 110, to render one or more selectable elements. Each selectable element may identify a different recommended alteration and may be operable to cause corresponding modified content to be rendered at one or more of the output devices. The modified content may include at least some of the original modifiable content (e.g., LLM rendered output or user-composed output) modified based on the recommended alteration corresponding to the actuated selectable element.

In some implementations, UX engine 136 may be configured to provide client device 110 with raw LLM responses (e.g., sequences of tokens intermixed with metadata instructions), which may be operable by rendering engine 112 to provide rendered LLM output. Additionally or alternatively, in some implementations, UX engine 136 may generate content that can be rendered more directly, such as HTML code that includes the raw LLM response and that can be rendered by rendering engine 112 or application 115, e.g., as a webpage.

Search system 140 is illustrated as including an SRD engine 142 and a results engine 144. Some of the engines can be omitted or combined with each other in various implementations. The SRD engine 142 can, for example, utilize indices 143 and/or other resources in identifying search result documents that are responsive to queries or requests as described herein. For example, SRD engine 142 can use queries or requests formulated by component(s) of NL based response system 120 to identify search result documents or other content that can be used for recommending alterations to rendered LLM output. For example, a user may be presented with a selectable element that suggests incorporating the most recent data pertaining to a particular topic—which may not yet be trained or fine-tuned into the LLM—into the LLM response. The results engine 144 can provide non-LLM generated search results that can be harvested for update-to-date content that may be assembled by LLM input engine 126 into a new LLM input prompt. LLM response generation engine 128 may then process this new LLM input prompt using an LLM 129 to generate modified LLM responses that are conditioned on content that has been generated more recently than the LLM was last trained or fine-tuned.

In some implementations, when a user issues a request for information about a particular topic, one or more components of NL based response system 120 and/or search system 140 may formulate a search query based on the topic. Search system 140 may then retrieve one or more documents that are responsive to the search query, and that contain data that post-dates the latest LLM training or fine-tuning. Data from the one or more documents that are responsive to the search query may be incorporated, e.g., by LLM input engine 126, into a subsequent LLM input prompt that is used to generate a modified version of the previously rendered LLM output.

FIG. 2 schematically depicts an example of how various components depicted in FIG. 1 may cooperate to carry out selected aspects of the present disclosure. As indicated at top, in some implementations, the components on the left side of the vertical dashed line may be part of NL based response system 120. Components on the right side of the vertical dashed line may be part of client device 110. In other implementations, various components may be implemented elsewhere.

Starting at top right, a first request 250A may be received at user input engine 111, which in turn provides data indicative of the first request 250A (e.g., the request itself, embedding(s) generated therefrom, etc.) to LLM input engine 126 of NL based response system 120. First request 250A may be typed, may be transcribed using automatic speech recognition (ASR) on a spoken utterance, or may even be an implied query. Whichever the case, data indicative of first request 250A may be assembled by LLM input engine 126 into an LLM prompt (not depicted) that is then processed by LLM response generation engine 128 using one or more LLMs from database 129 to generate a first raw LLM response 252A.

As noted previously, first raw LLM response 252A may include a sequence of tokens, such as a sequence of raw text that includes both content responsive to the request and metadata instructions interspersed therein. First raw LLM response 252A may be provided by UX engine 136 to rendering engine of client device 110. Rendering engine 112 may provide, e.g., a display and/or speakers, first rendered LLM output 254A (alternative referred to as "first content"), which may include various modalities of output, such as audible, images, text, etc.

Once rendered at client device 110, in some cases, the user may select, e.g., via user input engine 111, a portion 256A of the first rendered LLM output 254A. In various implementations, the selected portion 256A may be provided to selection mapping engine 114, which may in turn provide, to selection extraction engine 130 of NL based response system 120, data indicative of a mapping (e.g., starting and ending character positions) between the selected subportion 256A of the first rendered LLM output 254A and a corresponding subportion of first raw LLM response 252A. Selection extraction engine 130 may then use the mapping to extract a corresponding selected subportion 258 of the raw LLM response 252A. e.g. In other implementations, rather than a user selecting just a portion 256A of the first rendered LLM output 254A, the entire first rendered LLM output 254A/first LLM response 252A may be processed as described below.

Figure 2A:
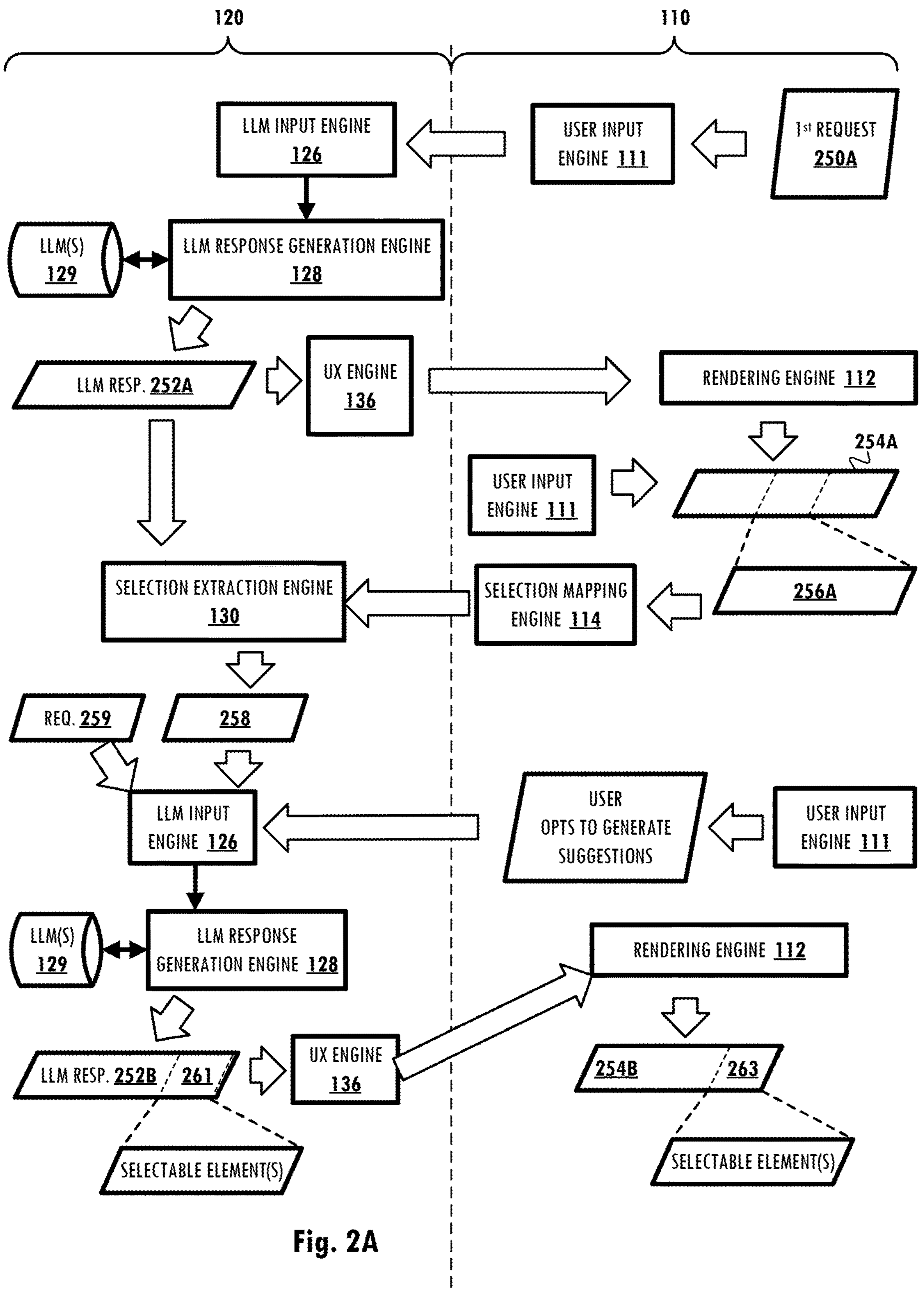
FIG. 2A and FIG. 2B schematically depict an example of how various components of FIG. 1 may cooperate to carry out selected aspects of the present disclosure.

In various implementations, the selected subportion 258 of the raw LLM response 252A (or the entire first LLM response 252A if the user did not select a subportion) may be assembled by LLM input engine 126 into a new input prompt, along with an (implicit) request to generate recommended (or proposed) alteration(s) to the first rendered LLM output 254A or selected portion 256A thereof. As shown in FIG. 2A, in some implementations, this new input prompt may be assembled in response to a user explicitly opting to generate suggestions. For example, the user may select a button that says, "Click to generate suggestions," or something to that effect. In other implementations, the new input prompt may be generated automatically, without explicit user input.

LLM input engine 126 may then provide the new LLM input prompt to LLM response generation engine 128. LLM response generation engine 128 may process this new input prompt using LLM(s) 129 to generate a second LLM response 252B. In various implementations, second LLM response 252B may include data 261 that is indicative of one or more selectable elements. For example, data 261 may include one or more uniform resource locators (URLs) or other markup language content that, when rendered at client device 110, is operable by a user to trigger incorporation of suggested alteration(s) of the original rendered LLM output 254A.

Second LLM response 252B may be provided by UX engine 136 to rendering engine 112 of client device 110. Rendering engine 112 may then present second rendered LLM output 254B that includes, at reference number 263, the previously mentioned one or more selectable elements. In some implementations, textual snippet(s) summarizing the respective suggested alterations may be rendered so that the user can discern how the original LLM response will be updated if the user chooses to operate one or more of the selectable elements. Suppose the original LLM response was an auto-generated resume (or curriculum vitae, "CV") for the user (generated using context data of the user, such as their profile data, previous resumes stored on the cloud, etc.). One selectable element may include a textual snippet that says, "Add a position for February 2021 to June 2023" (assuming there was a gap detected in the resume). Another selectable element might be "Add a description of your hobbies, such as paragliding or fly fishing," assuming those hobbies are derivable from the user's profile or other contextual data.

Figure 2B:
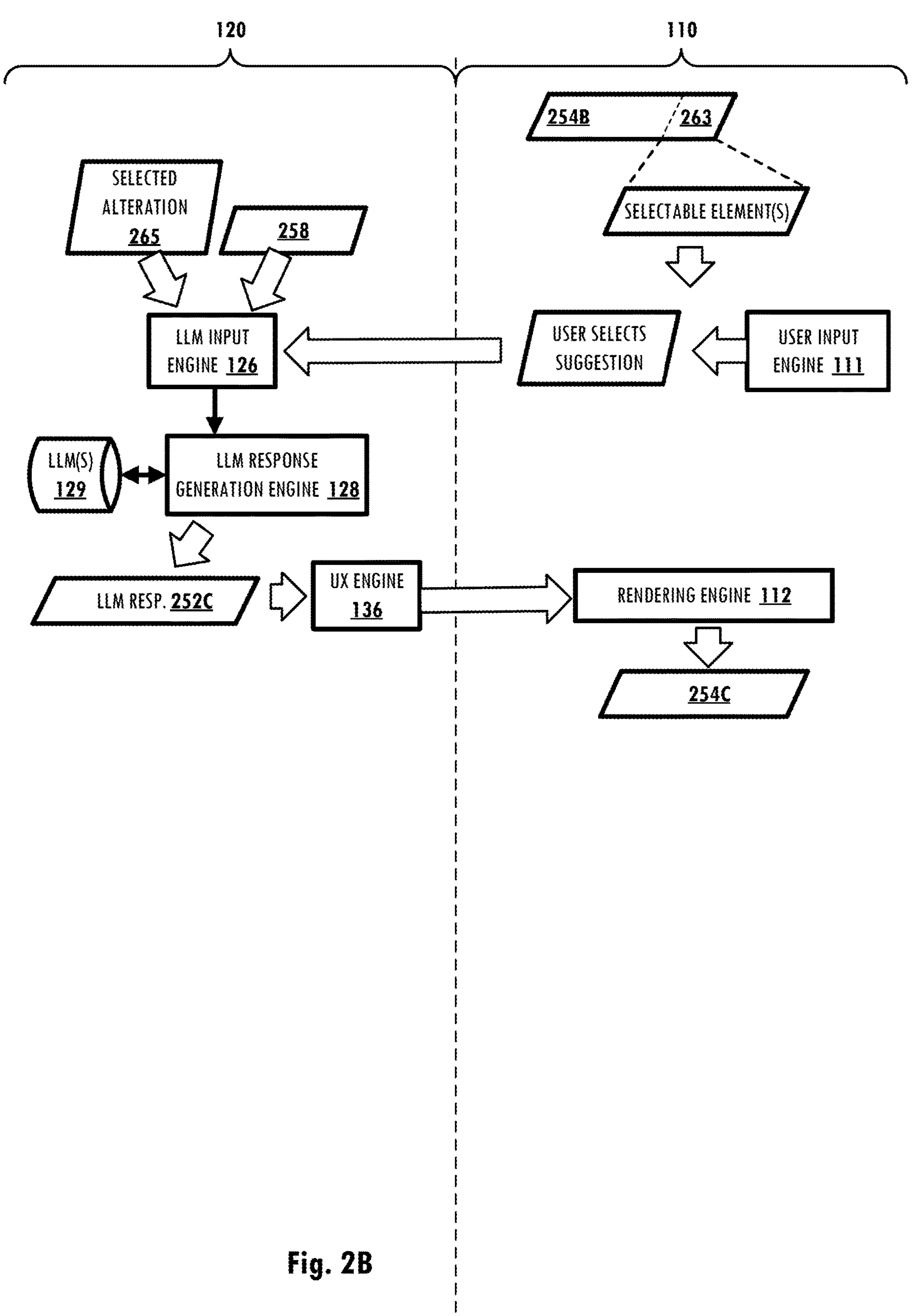

Referring now to FIG. 2B, in some implementations, when user input engine 111 detects that a selectable element has been operated by the user, the recommended alteration 265 that corresponds to the operated selectable element, and the original modifiable content (258 in FIGS. 2A-B, but could be any of 254A, 256A) may be assembled by LLM input engine 126 into a new input prompt. The new input prompt may be processed by LLM response generation engine 128 using the LLM 129 to generate a third LLM response 252C. In the third LLM response 252C, the modifiable content 258 (or 254A for instance) has been updated based on (e.g., incorporates) the recommended alteration 265. As before, third LLM response 252C may then be passed by UX engine 136 back to rendering engine 112. Rendering engine 112 may then provide third rendered LLM output 254C that includes the original modifiable content, modified based on the user's selection of the suggested alteration.

In FIGS. 2A-B, the user selected a subportion 256A of the first rendered LLM output 254A to generate suggested alterations. However, as noted above, this is not required. Suggested alterations can be generated for the entire first rendered LLM output 254A as well. In addition, various operations may be performed slightly differently than depicted in FIGS. 2A-B without departing from the present disclosure. For instance, in some implementations, rather than the user explicitly opting to generate suggestions, the selectable elements may be generated automatically, e.g., while the user has an opportunity to read or otherwise consumes the first rendered LLM output 254A. Once ready, those selectable elements may be presented as all or part of second rendered LLM output 254B (e.g., at the reference number 263).

In some implementations, the system may not wait until the user selects a selectable element in order to generate possible third LLM outputs (e.g., 252C). In various implementations, the system may automatically generate these LLM outputs that include modified versions of the original LLM output, e.g., in the background while the user reads or otherwise consumes the first rendered LLM output 254A. As a result, these modified versions can, in some implementations, be cached at system 120 and/or at client device 110. If the user operates a selectable element corresponding to one of these cached modified versions, the cached modified version may be surfaced to the user more-or-less immediately, without requiring the user to wait for the LLM to be applied to the data (which, given the hundreds of billions of parameters or more that are common in LLMs, may take multiple seconds to process).

In some implementations, the fully modified versions of the first rendered LLM output 254A may be generated automatically first, before selectable elements are generated. Instead of being generated beforehand, the selectable elements may be formulated based on the fully modified versions. For instance, if the first rendered LLM output 254A is a project proposal that fails to address risk, then a fully modified version of that project proposal that discusses risk may be generated in the background, e.g., without the user requesting it. Once generated, the fully modified version of the project proposal may be processed, e.g., by LLM response generation engine 128 using one or more LLM 129, to generate a brief summary of the modifications that were made. This brief summary may be incorporated into a selectable element that is presented to the user, to inform the user what changes would be made. As a result, when the user operates the selectable element, the fully modified version may be presented, e.g., by rendering engine 112, more-or-less instantaneously because it was already generated.

Due to LLMs often having hundreds of billions of parameters or more, generating fully modified versions of first rendered LLM output 254A (or of portion 256A) may be expensive in terms of computational resources, time, and/or energy expenditure. It may be beneficial to only proceed with generating fully modified versions of first rendered LLM output 254A when circumstances warrant. Accordingly, in some implementations, fully modified versions of first rendered LLM output 254A may or may not be selectively or conditionally generated based on factors such as current computational load of system 120, network traffic, context length of the LLM selected by LLM selection engine 124, user preferences, etc. As one example, if the current computational load of system 120 falls below some threshold(s), and/or if energy prices fall below some other threshold, modified versions of first rendered LLM response 254A may be generated and/or cached automatically. However, if the current computational load of system 120 and/or energy costs exceed these thresholds, then modified versions of first rendered LLM output 254A may not be generated until a user explicitly requests them.

Figure 3A:
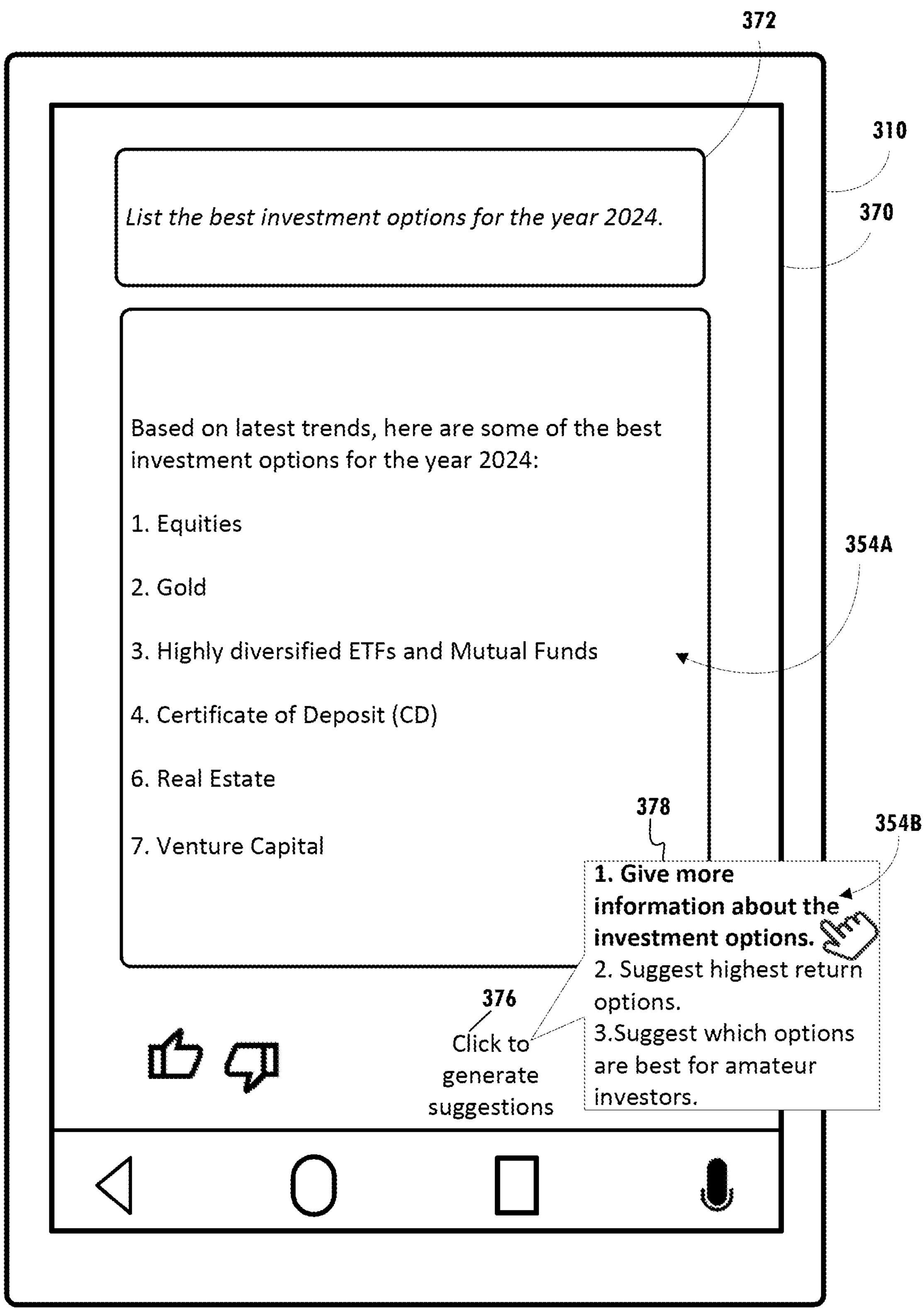
FIG. 3A and FIG. 3B depict an example scenario in which selected aspects of the present disclosure are implemented.

FIG. 3A depicts an example client device 310 in the form of a tablet computer that is being used to engage with NL based response system 120. Client device 310 includes a display 370 on which a query input field 372 is rendered. A user (not depicted) has entered, into query input field 372 (by typing or having a spoken utterance speech recognized), the request, "List the best investment options for 2024." A rendered LLM output 354A (or "first content") that may share various characteristics with rendered LLM output 254A in FIG. 2 is generated and rendered on display 370, e.g., by rendering engine 112, based on a raw LLM response (not depicted, e.g., 252A in FIG. 2) that was generated by LLM response generation engine 128. Also rendered on display 370 are a thumbs up and down that are operable by the user to provide positive or negative feedback, respectively, about rendered LLM output 354A.

Further, a selectable element 376 is rendered to be operable to generate recommended alterations to the rendered LLM output 354A. In some implementations, operating this selectable element 376 may be similar to FIG. 2A where the user opted to generate suggestion(s). In other implementations, operation of element 376 may not be necessary (e.g., suggested alterations may be generated in the background regardless of whether the user opts in) and selectable element 376 itself may be omitted.

The operation of selectable element 376 may cause a pop-up 378 to be rendered on display 370. Pop-up 378 may include, as second rendered LLM output 354B (sharing characteristics with 254B), one or more selectable elements, each selectable element corresponding to a different suggested alteration. The user may operate one of the selectable elements of second rendered LLM output 354B, e.g., "Give more information about the investment options," to modify LLM output 354A. When this particular selectable element is operated, in some implementations, the corresponding recommended alteration and rendered LLM output 354A may be assembled into a second input prompt that is processed using the LLM to generate a new LLM response in which first rendered LLM output 354A has been updated based on (e.g., incorporates) the recommended alteration. In other implementations, this second input prompt may have already been generated and used in the background to generate a modified version of the first rendered LLM output 354A.

Figure 3B:
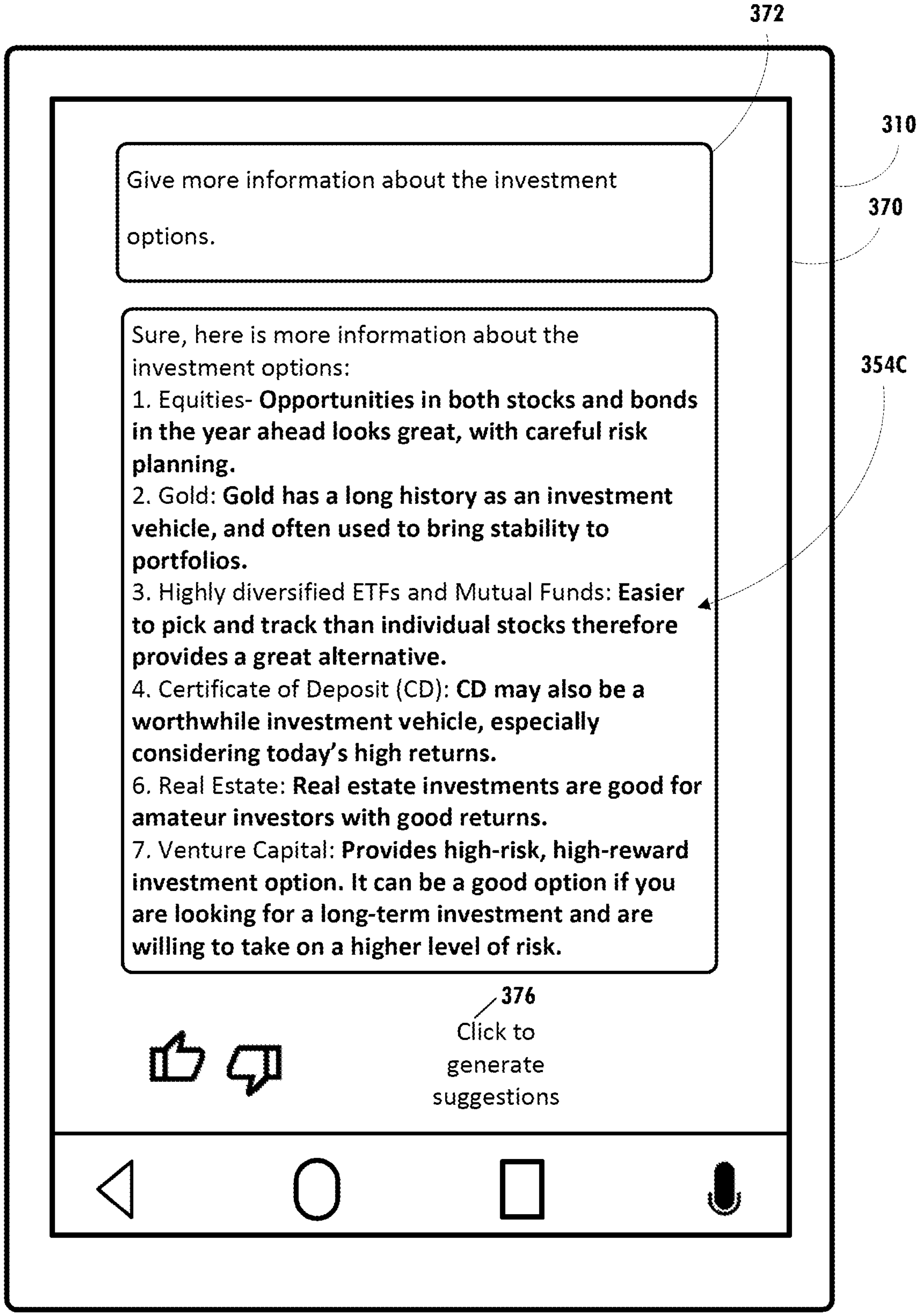

FIG. 3B depicts a result of when the user operates the selectable element of FIG. 3A. The first rendered LLM output 354A is still present, but has been modified to incorporate (shown in bolded lettering for illustrative purposes) the suggested alteration corresponding to the operated selectable element of second rendered LLM output 354B to yield third rendered LLM output 354C, which may share various characteristics with 254C in FIG. 2B. It can be seen in FIG. 3B that the first rendered LLM output 354A has been modified into third rendered LLM output 354C in which additional details are provided for each of the investment options.

Figure 4A:
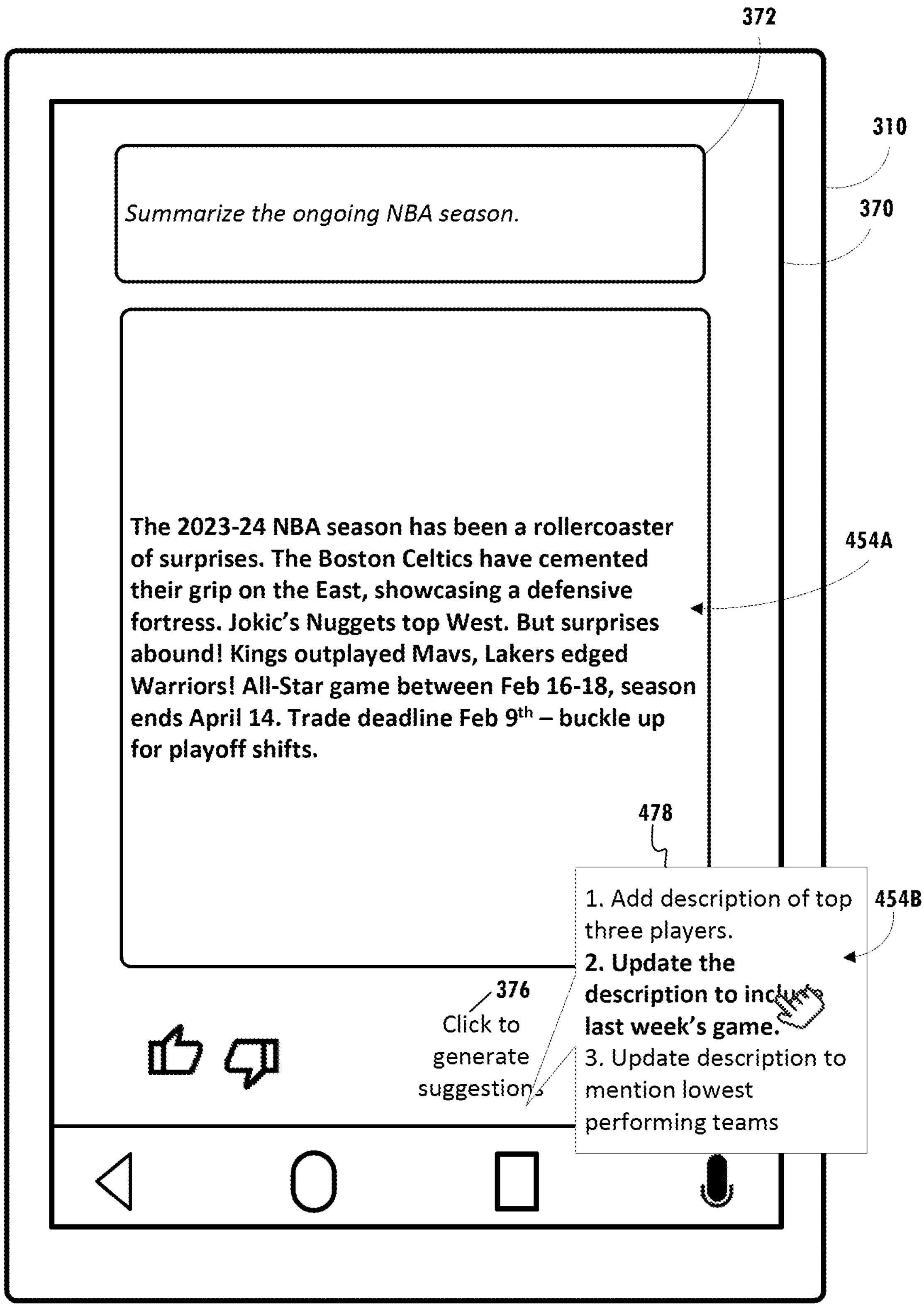
FIG. 4A and FIG. 4B depict another example scenario in which selected aspects of the present disclosure are implemented.

FIG. 4A shows another example in which the user has entered, into query input field 372 (by typing or having a spoken utterance speech recognized), the request, "Summarize the ongoing NBA season." A first rendered LLM output 454A that may share various characteristics with first rendered LLM output 254A in FIG. 2 is generated and rendered on display 370, e.g., by rendering engine 112, based on a raw LLM response (not depicted, e.g., 252A in FIG. 2) that was generated by LLM response generation engine 128. First rendered LLM output 454A may include a succinct summary of the current National Basketball Association (NBA) season. However, as explained herein, LLMs (and more generally, large generative models) may only be trained and/or fine-tuned periodically, e.g., at night or during downtime. Consequently, these models may not necessarily have the latest information about current events. Accordingly, FIGS. 4A-B demonstrate how search system 140 may be leveraged to condition LLM output based on recent data that post-dates the most recent training or fine-tuning of the LLM.

Once again, first rendered LLM output 454A may be processed by LLM response generation engine 128 using LLM(s) 129 to generate pop up 478 that contains second rendered LLM output 454B. Second rendered LLM output 454B may include one or more selectable elements. In this example, the selectable elements give the user the options of (i) adding a description of the top three players in the league, (ii) updating the description to include last week's games, and (iii) update the description to mention the lowest performing teams in the league.

Figure 4B:
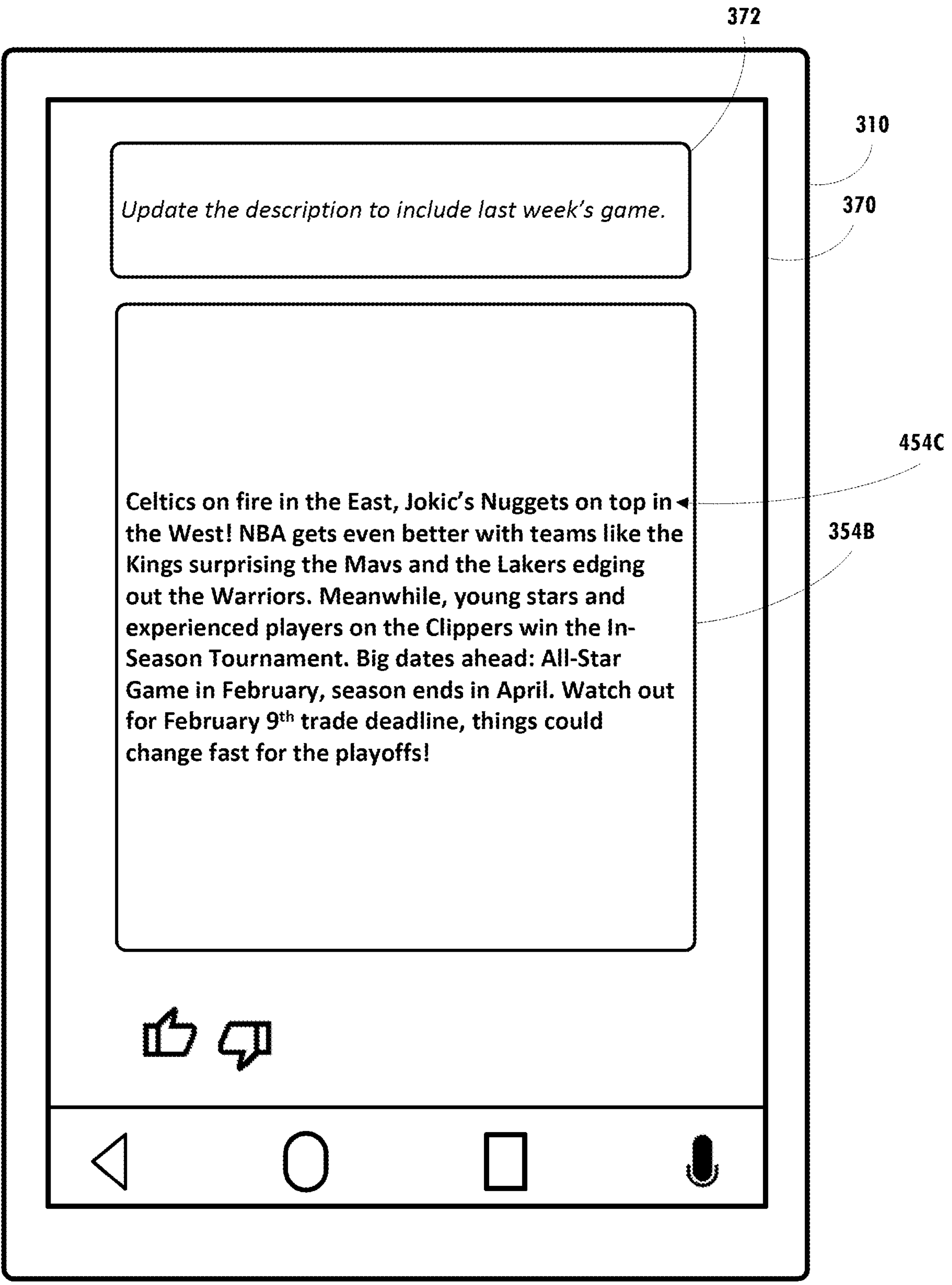

FIG. 4B depicts the result of the user operating the selectable element that updates the description to include last week's games. In this example, search system 140 may retrieve documents and/or information that describe events of the last week in the NBA season. LLM input engine 126 may incorporate this data (e.g., token embeddings, article summaries, etc.) into an input prompt that is processed by LLM response generation engine 128 using LLM(s) to generate third rendered LLM output 454C. Third rendered LLM output 454C includes first rendered LLM output 456A, modified based on (e.g., to incorporate) the recommended alteration. For example, the third rendered LLM output 454C mentions the "young stars" winning an "in-season" tournament—information that may be more recent than the most recent instance in which the LLM was fine-tuned.

Figure 5:
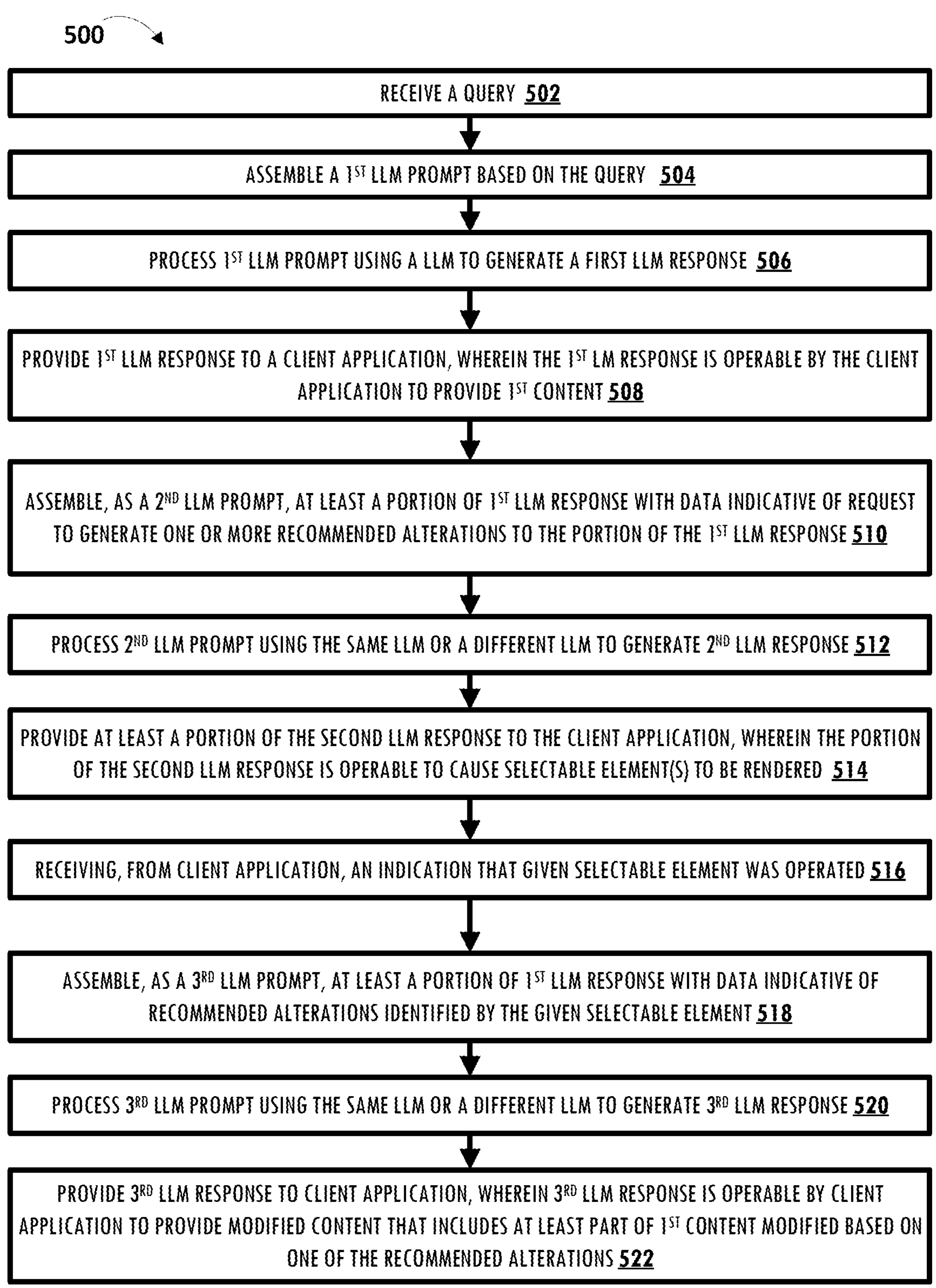
FIG. 5 depicts an example method for carrying out selected aspects of the present disclosure.

Turning now to FIG. 5, a flowchart is depicted that illustrates an example method 500 of implementing selected aspects of the present disclosure. For convenience, the operations of the method 500 are described with reference to a system that performs the operations. This system of the method 500 includes one or more processors, memory, and/or other component(s) of computing device(s). Moreover, while operations of the method 500 are shown in a particular order, this is not meant to be limiting. One or more operations may be reordered, omitted, and/or added.

At block 502, the system may receive a query or request. For example, a user may speak or type a natural language request that is processed by user input engine 111 and provided to UX engine 136 and/or LLM input engine 126. At block 504, the system, e.g., by way of LLM input engine 126, may assemble a first LLM prompt based on the query.

At block 506, the system, e.g., by way of LLM response generation engine 128, may process the first LLM prompt using an LLM (e.g., 129) to generate a first (raw) LLM response (e.g., 252A in FIG. 2). As noted elsewhere herein, first LLM response (and other "raw" LLM responses described herein) may include a sequence of tokens, such as a sequence of raw text intermixed with metadata instructions in some cases. Metadata instructions may include formatting instructions (e.g., identified fonts, line breaks, indents, spacing, etc.), as well as instructions for rendering other modalities of data, such as images, videos, audio, graphics, etc.

At block 508, the system, e.g., by way of UX engine 136, may provide the first LLM response to a client application, such as application 115, rendering engine 112, etc. In various implementations, the first LLM response may be operable by the client application to cause first content derived (e.g., 254A in FIG. 2) from the first LLM response to be rendered at one or more output devices. For instance, rendering engine 112 may be configured to process the first LLM response to generate a HTML document object model (DOM) hierarchy that causes the relevant content contained in the first LLM response to be rendered or "surfaced", e.g., by application 115, in a useful way.

At block 510, the system, e.g., by way of LLM input engine 126, may assemble at least a portion of first LLM response 252A with data indicative of a (implicit) request to generate one or more recommended alterations to the portion of first LLM response, as a second LLM prompt. Note that in other implementations, a user may use techniques described herein to make suggested alterations to content they compose, in addition to or instead of LLM-composed content. In such implementations, blocks 502-508 may be omitted, and method 500 may begin at block 510. Instead of assembling the second LLM input prompt with at least a portion of the first LLM response, LLM input engine 126 may assemble a first LLM input prompt that includes the user-composed content, plus the (implicit) request to generate one or more recommended alterations to the user-composed content (or selected portion thereof).

At block 512, the system, e.g., by way of LLM response generation engine 128, may process the second LLM prompt using the same LLM (e.g., 129) or a different LLM to generate a second LLM response (e.g., 252B in FIG. 2). At block 514, the system, e.g., by way of UX engine 136, may provide the second LLM response (e.g., 252B) to the client application 115. In various implementations, the second LLM response may be operable by the client application to cause selectable elements to be rendered, e.g., as part of second rendered LLM output 254B/354B/454B, that may include at least a part of the first rendered LLM output (e.g., 254A/354A/454A) and the modified version (e.g., 256B) of the first rendered LLM output (e.g., 254A) with the recommended alterations.

At block 516, the system, e.g., by way of UX engine 136, may receive an indication that a given selectable element has been operated by the user. At block 518, a third LLM prompt is assembled from at least a portion of first LLM response 252A with data indicative of the recommended alteration corresponding to the operated selectable element. At block 520, the system, e.g., by way of LLM response generation engine 128, may process the third LLM prompt using the same LLM (e.g., 129) or a different LLM to generate a third LLM response (e.g., 252C). At block 522, the system, e.g., by way of UX engine 136, may provide the third LLM response (e.g., 252C) to the client application 115. In various implementations, the third LLM response may be operable by the client application 115 to provide modified content (e.g., 254C/354C/454C) that may include at least a part of the first content (e.g., 254A) modified based on the recommended alteration corresponding to the operated selectable element.

Figure 6:
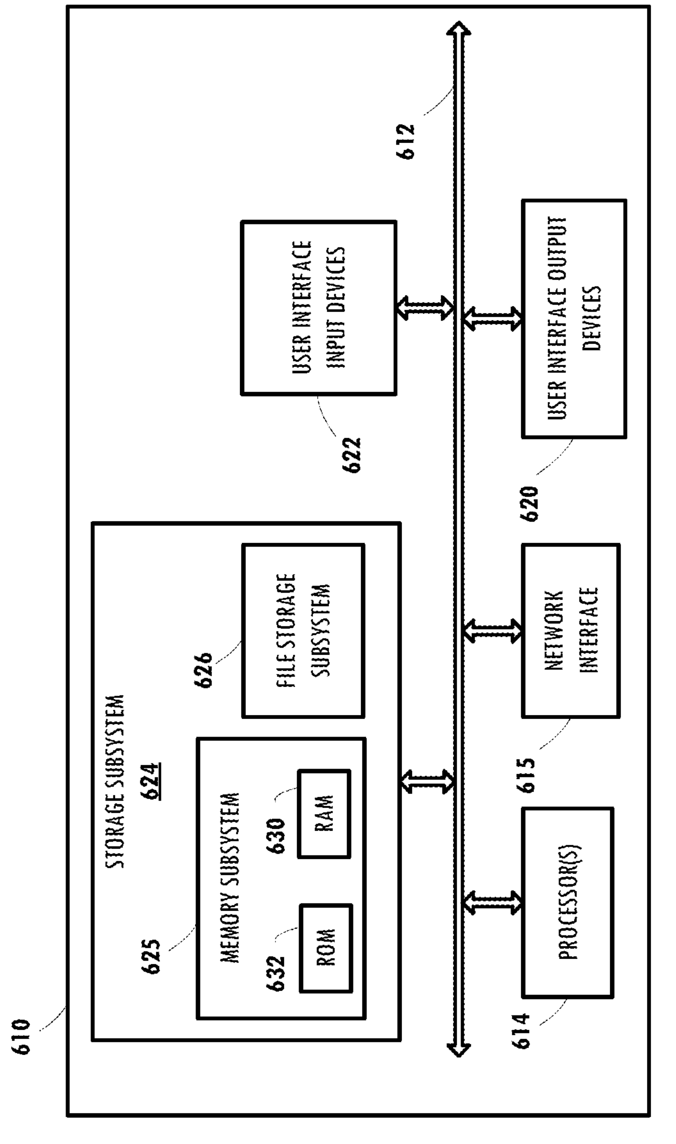
FIG. 6 schematically depicts an example computer architecture that can be configured to carry out selected aspects of the present disclosure.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more aspects of systems 120 and/or 140. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple buses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:

processing a large language model (LLM) prompt using an LLM to generate a first LLM response;

providing the first LLM response to a client application, wherein the first LLM response is operable by the client application to cause first content derived from the first LLM response to be rendered at one or more output devices;

assembling, as a second LLM prompt, at least a portion of the first LLM response with data indicative of a request to generate one or more recommended alterations to the portion of the first LLM response;

processing the second LLM prompt using the LLM to generate a second LLM response; and providing at least a portion of the second LLM response to the client application, wherein the portion of the second LLM response is operable by the client application to:

locally cache, prior to receiving a user selection of one or more selectable elements, one or more instances of modified content corresponding to the one or more recommended alterations; and cause one or more selectable elements to be rendered at one or more of the output devices, wherein each of the one or more selectable elements:

identifies a respective one of the recommended alterations, and is operable to cause a cached instance of the corresponding modified content to be rendered at one or more of the output devices, wherein the modified content includes at least some of the first content modified based on the respective one of the recommended alterations.

2. The method of claim 1, further comprising:

receiving, from the client application, an indication that one or more of the selectable elements was operated; and in response to the receiving, providing a remainder of the second LLM response to the client application, wherein the modified content corresponding to the operated selectable element is derived from the remainder of the second LLM response.

3. The method of claim 1, further comprising:

receiving, from the client application, an indication that one or more of the selectable elements was operated;

in response to the receiving:

assembling, as a third LLM prompt, at least a portion of the first LLM response and data indicative of the recommended alteration identified by the operated selectable element, processing the third LLM prompt using the LLM to generate a third LLM response, and providing at least a portion of the third LLM response to the client application, wherein the portion of the third LLM response is operable by the client application to cause the modified content to be rendered at one or more of the output devices.

4. The method of claim 1, further comprising:

receiving, from the client application, an indication of a subportion of the first content that has been selected using one or more input devices; and extracting, as the portion of the first LLM response that is assembled into the second LLM prompt, a subportion of the first LLM response that corresponds to the selected subportion of the first content.

5. The method of claim 1, wherein the portion of the second LLM response provided to the client application includes the entire second LLM response.

6. The method of claim 1, wherein a given selectable element of the one or more selectable elements comprises a textual summary of the modified content that is rendered in response to operation of the given selectable element.

7. The method of claim 1, wherein the first LLM response comprises one or more time descriptions forming an incomplete timeline, and one or more of the recommended alterations includes an additional time description to fill a gap in the incomplete timeline.

8. The method of claim 1, further comprising:

formulating a search query based on one or more details of the first LLM response; and retrieving, from a search engine, one or more documents that are responsive to the search query;

wherein a given selectable element of the one or more selectable elements is operable to cause additional content from the one or more documents that are responsive to the search query to be included in the second LLM prompt.

9. A method implemented using one or more processors, comprising:

receiving, from a user via a client application, a user-composed content;

assembling, as a first large language model (LLM) prompt, data indicative of the user-composed content and data indicative of a request to generate one or more recommended alterations to the user-composed content;

processing the first LLM prompt using an LLM to generate a first LLM response; and providing at least a portion of the first LLM response to the client application, wherein the portion of the first LLM response is operable by the client application to:

locally cache, prior to receiving a user selection of one or more selectable elements, one or more instances of modified content corresponding to the one or more recommended alterations; and cause one or more selectable elements to be rendered at one or more output devices, wherein each of the one or more selectable elements:

identifies a respective one of the recommended alterations, and is operable to cause a cached instance of the corresponding modified content to be rendered at one or more of the output devices, wherein the modified content includes at least some of the user-composed content modified based on the respective one of the recommended alterations.

10. The method of claim 9, further comprising:

receiving, from the client application, an indication that one or more of the selectable elements was operated; and in response to the receiving, providing a remainder of the first LLM response to the client application, wherein the modified content corresponding to the operated selectable element is derived from the remainder of the first LLM response.

11. The method of claim 9, further comprising:

receiving, from the client application, an indication that one or more of the selectable elements was operated;

in response to the receiving:

assembling, as a second LLM prompt, at least a portion of the user-composed content and data indicative of the recommended alteration identified by the operated selectable element, processing the second LLM prompt using the LLM to generate a second LLM response, and providing at least a portion of the second LLM response to the client application, wherein the portion of the second LLM response is operable by the client application to cause the modified content to be rendered at one or more of the output devices.

12. A system comprising one or more processors and memory storing instructions that, in response to execution by the one or more processors, cause the one or more processors to:

process a large language model (LLM) prompt using an LLM to generate a first LLM response;

provide the first LLM response to a client application, wherein the first LLM response is operable by the client application to cause first content derived from the first LLM response to be rendered at one or more output devices;

assemble, as a second LLM prompt, at least a portion of the first LLM response with data indicative of a request to generate one or more recommended alterations to the portion of the first LLM response;

process the second LLM prompt using the LLM to generate a second LLM response; and provide at least a portion of the second LLM response to the client application, wherein the portion of the second LLM response is operable by the client application to:

locally cache, prior to receiving a user selection of one or more selectable elements, one or more instances of modified content corresponding to the one or more recommended alterations; and cause one or more selectable elements to be rendered at one or more of the output devices, wherein each of the one or more selectable elements:

identifies a respective one of the recommended alterations, and is operable to cause a cached instance of the corresponding modified content to be rendered at one or more of the output devices, wherein the modified content includes at least some of the first content modified based on the respective one of the recommended alterations.

13. The system of claim 12, further comprising instructions to:

receive, from the client application, an indication that one or more of the selectable elements was operated; and in response to the received indication, provide a remainder of the second LLM response to the client application, wherein the modified content corresponding to the operated selectable element is derived from the remainder of the second LLM response.

14. The system of claim 12, further comprising instructions to:

receive, from the client application, an indication that one or more of the selectable elements was operated;

in response to the received indication:

assemble, as a third LLM prompt, at least a portion of the first LLM response and data indicative of the recommended alteration identified by the operated selectable element, process the third LLM prompt using the LLM to generate a third LLM response, and provide at least a portion of the third LLM response to the client application, wherein the portion of the third LLM response is operable by the client application to cause the modified content to be rendered at one or more of the output devices.

15. The system of claim 12, further comprising instructions to:

receive, from the client application, an indication of a subportion of the first content that has been selected using one or more input devices; and extract, as the portion of the first LLM response that is assembled into the second LLM prompt, a subportion of the first LLM response that corresponds to the selected subportion of the first content.

16. The system of claim 12, wherein the portion of the second LLM response provided to the client application includes the entire second LLM response.

17. The system of claim 12, wherein a given selectable element of the one or more selectable elements comprises a textual summary of the modified content that is rendered in response to operation of the given selectable element.

18. The system of claim 12, wherein the first LLM response comprises one or more time descriptions forming an incomplete timeline, and one or more of the recommended alterations includes an additional time description to fill a gap in the incomplete timeline.

19. The method of claim 1, further comprising:

determining whether a current computational load falls below a threshold;

wherein processing the second LLM prompt using the LLM to generate the second LLM response is performed in response to determining that the current computational load falls below the threshold.

20. The method of claim 1, further comprising:

prior to processing the second LLM prompt, selecting the LLM from a plurality of candidate large language models using a classifier trained to identify which of the plurality of candidate large language models is suited to generate the second LLM response based on a current user context.

* * * * *